United States Patent [19]

Marcus et al.

[11] Patent Number: 5,696,359
[45] Date of Patent: Dec. 9, 1997

[54] PORTABLE LOUDSPEAKER/DIRECTIONAL MICROPHONE PERIPHERAL

[75] Inventors: Larry Allen Marcus, Fishers; Christopher T. Welsh, Noblesville, both of Ind.

[73] Assignee: Lucent Technologies Inc., Murray Hill, N.J.

[21] Appl. No.: 557,760

[22] Filed: Nov. 13, 1995

[51] Int. Cl.⁶ .................................................. A47B 81/06
[52] U.S. Cl. ........................................... 181/199; 181/141
[58] Field of Search .......................... 181/148, 141, 181/199; 381/24, 88, 90

[56] References Cited

U.S. PATENT DOCUMENTS

| | | |
|---|---|---|
| 1,969,704 | 8/1934 | D'Alton . |
| 3,688,864 | 9/1972 | Guss . |
| 4,549,631 | 10/1985 | Bose . |
| 5,025,885 | 6/1991 | Froeschle . |
| 5,092,424 | 3/1992 | Schreiber et al. . |
| 5,440,645 | 8/1995 | Freadman .............. 181/199 X |
| 5,481,616 | 1/1996 | Freadman .............. 381/24 X |
| 5,550,921 | 8/1996 | Freadman .................. 381/24 |
| 5,583,743 | 12/1996 | Levins et al. ........... 181/199 X |

*Primary Examiner*—Khanh Dang
*Attorney, Agent, or Firm*—Thomas Stafford

[57] ABSTRACT

A loudspeaker system which can be utilized with laptop PCs employs a loudspeaker enclosure having a unique shape which can easily be mounted to the back of a display of the laptop PC and also be easily removed for storing and/or transporting. Additionally, the enclosures of the loudspeaker system have been designed to allow the physical coupling of them together into a compact package so that they can be easily stored and/or transported, for example, in a briefcase for use during transit or at a remote location. This coupling of the loudspeaker enclosures is realized by employing a loudspeaker enclosure which is in the form of an "L-shape". Consequently, the loudspeaker enclosures can be placed upon each other and locked into place forming a relatively small compact package.

14 Claims, 4 Drawing Sheets

PORTABLE LOUDSPEAKER/DIRECTIONAL MICROPHONE PERIPHERAL

RELATED APPLICATION

U.S. patent application Ser. No. 08/557,764 was filed concurrently herewith.

TECHNICAL FIELD

This invention relates to audio systems and, more particularly, to loudspeaker systems.

BACKGROUND OF THE INVENTION

In many portable multimedia computer arrangements, for example, laptop and/or notebook personal computers (PCs), it is desirable to have high quality sound. Many of these laptop PCs have built in loudspeaker systems. Unfortunately, the sound quality from these systems is lacking because of insufficient compliant air volume, which as is well known, is a must for quality sound from the loudspeaker system. Heretofore, quality sound was only realized by using so-called desktop peripheral loudspeakers. Use of such loudspeakers is undesirable because they are large and not easily stored or transported. Additionally, loudspeaker systems historically have been of a rectangular cubic shape, for simplicity of fabrication and manufacture. This would be unacceptable for a loudspeaker system intended to be mounted on a laptop PC display because the amount of compliant air volume required would cause the enclosure to be too large and, therefore, would not be aesthetically acceptable. Also such large loudspeaker systems are not easily stored and/or transportable for use with a laptop PC during transit or at some remote location.

SUMMARY OF THE INVENTION

The problems and limitations of prior loudspeaker systems employed with laptop PCs is overcome by employing loudspeakers including an enclosure having a unique shape which can easily be mounted to the back of a display of the laptop PC and also be easily removed for storing and/or transporting. Additionally, the enclosures of the loudspeaker system have been designed to allow the physical coupling of them together into a compact package so that they can be easily stored and/or transported, for example, in a briefcase for use during transit or at a remote location. This coupling of the loudspeaker enclosures is realized by employing a loudspeaker enclosure having first and second legs which are arranged in the form of an "L-shape". Consequently, the loudspeaker enclosures can be placed upon each other and locked into place forming a relatively small compact package.

DETAILED DESCRIPTION

Figure 1:
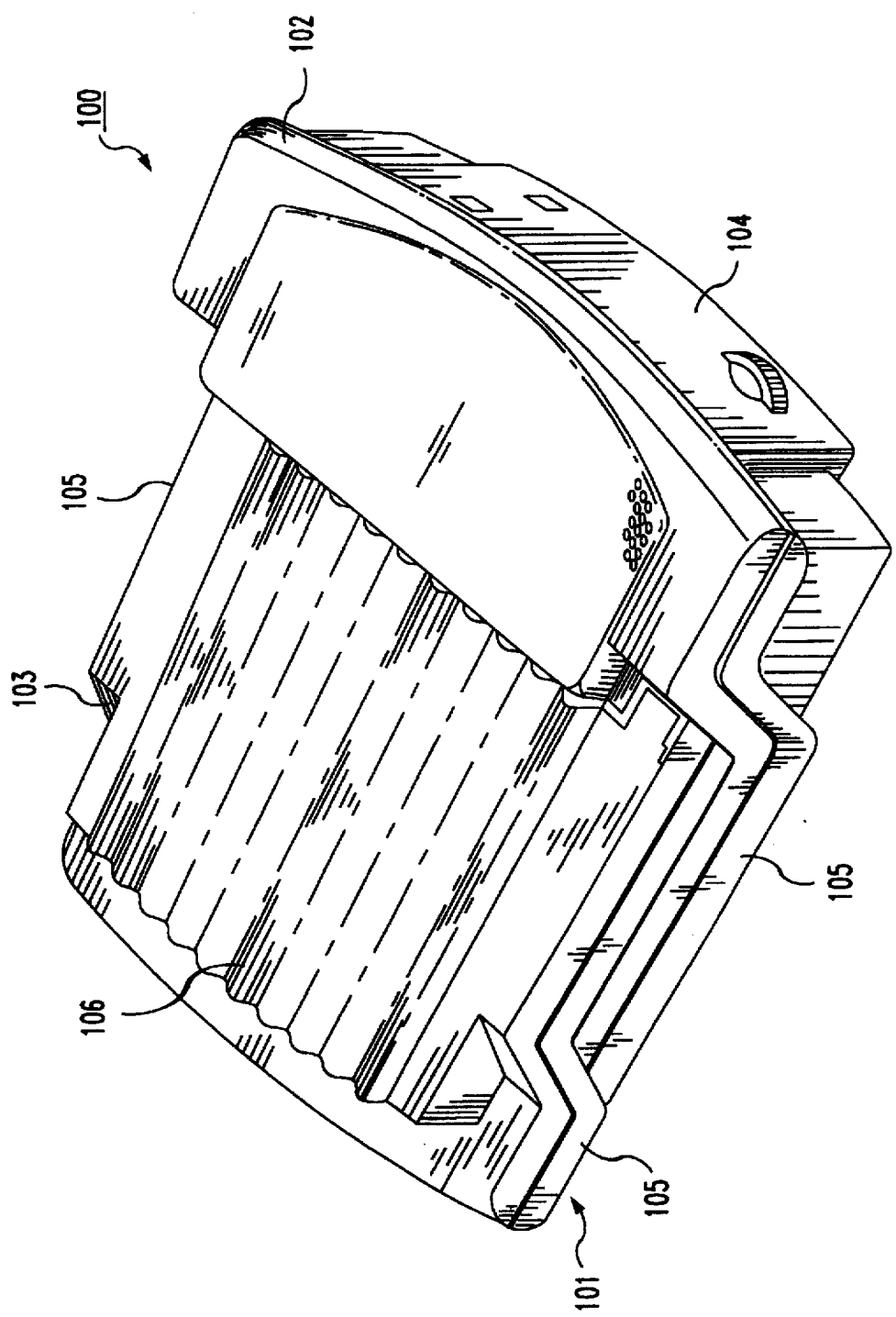
FIG. 1 is a perspective view of loudspeakers having enclosures coupled and locked together in accordance with the invention.

FIG. 1 is a perspective view of loudspeaker 100 and loudspeaker 101 coupled to each other in a locked position to form a compact arrangement, in accordance with the invention. Each of loudspeakers 100 and 101 include a unique loudspeaker enclosure, namely, enclosures 102 and 103, respectively, will be shown more clearly later, each of enclosures 102 and 103 is an L-shape having a first leg 104 (which is not shown for enclosure 103) and a second leg 105. The desired L-shape is obtained by an upper surface of second leg 105 and a rear surface of leg 104 forming substantially a right angle (90°). It will be apparent that the angle between legs 104 and 105 does not have to be exactly a right angle. As shown, the bottom surface 106 of loudspeaker enclosure 103 is facing upward. Similarly legs 105 of loudspeaker enclosures 102 and 103 are facing each other in the coupled and locked position, as shown. Additionally, the height of leg 104 above the top surface of leg 105 is substantially equal to the thickness of leg 105. In one embodiment, the height of leg 105 is ¾ inches. The locking mechanism will be described below in conjunction with FIGS. 4 and 5. In one embodiment of the invention, the resulting compact arrangement is 7 inches long by 4 and ½ inches wide and 1 and ¾ inches thick. Thus, it is seen that when loudspeakers 100 and 101 are in the coupled and locked position they form a compact arrangement that is readily storable and easily transportable.

Figure 2:
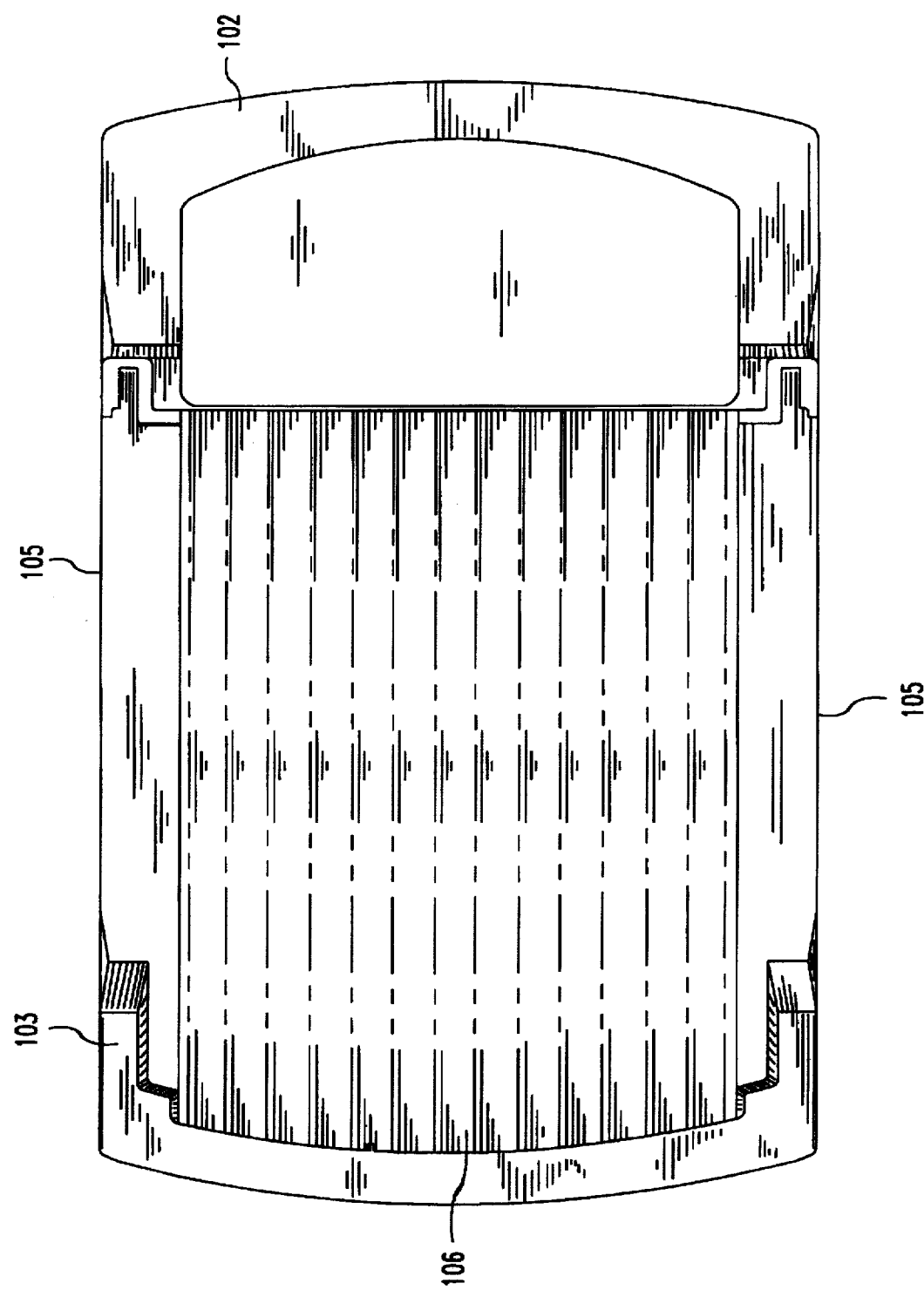
FIG. 2 is a top view of a pair of loudspeakers including the enclosures coupled and locked together in accordance with the invention.

FIG. 2 is a top view of a pair of loudspeakers including the enclosures coupled together in accordance with the invention, as shown in FIG. 1. The elements which have been numbered similarly to those in FIG. 1 will not be described here again.

Figure 3:
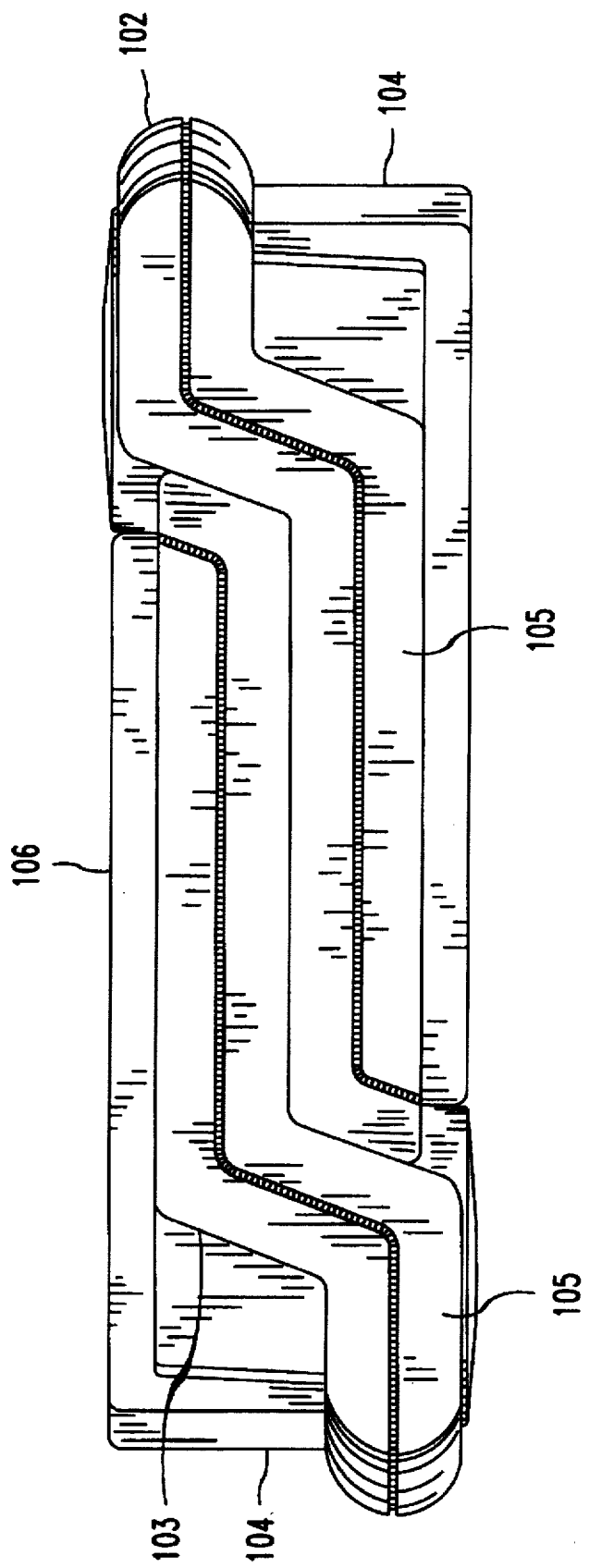
FIG. 3 is a side view showing the loudspeaker enclosures coupled and locked together in accordance with the invention.

FIG. 3 is a side view showing the loudspeakers 100 and 101 with their respective enclosures 102 and 103 coupled and locked together, in accordance with the invention, as shown in FIG. 1. The elements which have been numbered similarly to those in FIG. 1 will not be described here again.

Figure 4:
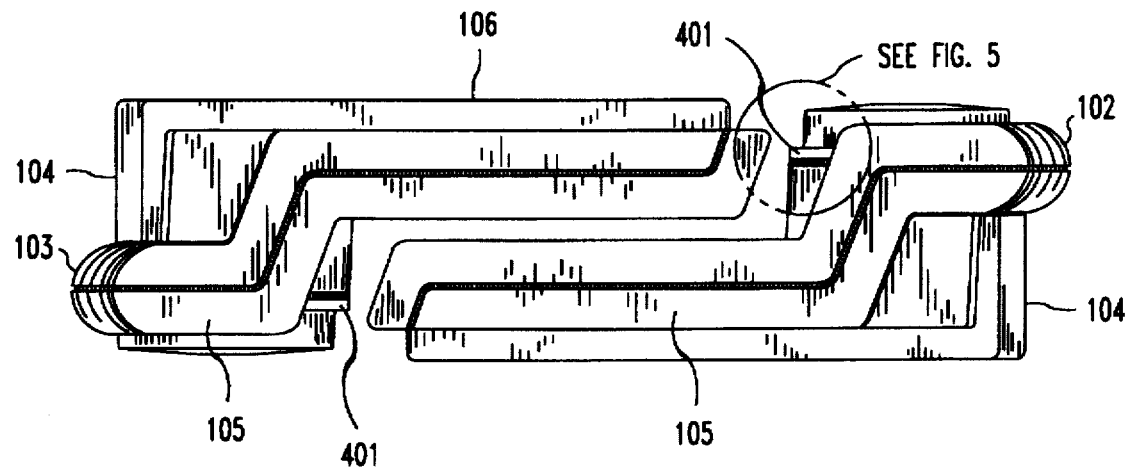
FIG. 4 is a side view showing the loudspeaker enclosures separated just before being coupled and locked together illustrating a portion of the locking mechanism.

FIG. 4 is a side view showing the loudspeakers 100 and 101 with their respective enclosures 102 and 103 separated before being coupled and illustrating a portion of the locking mechanism. The elements which have been numbered similarly to those in FIG. 1 will not be described here again. Each of loudspeaker enclosures 102 and 103 have the same coupling and locking features. Shown on an inner surface portion of legs 104 are locking slots 401 which act as "detents" for the locking mechanism shown in FIG. 5 and described below. Note that each side of legs 104 has similar locking slots 401 so that there are four such slots 401 in all, two in leg 104 of loudspeaker enclosure 102 and two in leg 104 of loudspeaker enclosure 103. Thus, as shown, locking slots 401 are on opposite inner surfaces of loudspeaker enclosure legs 104.

Figure 5:
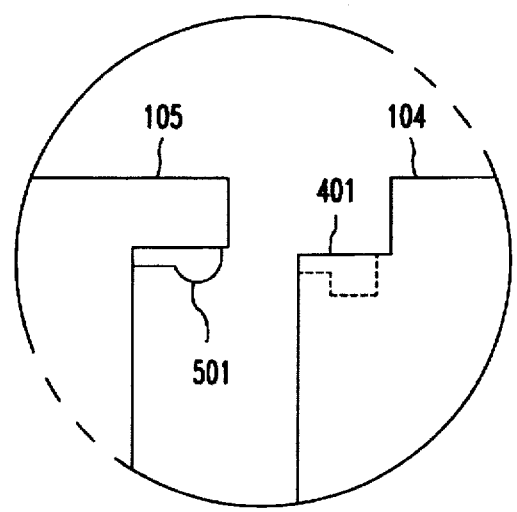
FIG. 5 is a top view of the circled portion of FIG. 4 showing one of the locking mechanisms.

FIG. 5 is a top view of the circled portion of FIG. 4 showing one of the locking mechanisms. Specifically, shown is locking slot 401, which acts as a detent for locking tab 501 on the other loudspeaker enclosure which is going to be coupled via locking slot 401. As indicated above, locking slots 401 are in the inner surfaces of legs 104 while locking tabs 501 are on an inner surface of legs 105, as shown. Note that both locking slots 401 are on inner surfaces of loudspeaker enclosure legs 104 opposite each other. Similarly, locking tabs 501 are on inner surfaces of loudspeaker enclosure legs 105 opposite each other. Consequently, the locking mechanisms are hidden out of view when loudspeaker enclosures 102 and 103 are in the coupled and locked position and they do not protrude outward either in the coupled or uncoupled positions. Thus, there are no protruding elements of the locking mechanism when either in the coupled or uncoupled positions of the loudspeaker enclosures. The operation is such that tab 501 will snap into 401 when the loudspeaker enclosures 102 and 103 (FIG. 1) are coupled together thereby locking them in that position. As noted above, slots 401 are in both sides of legs 104 of loudspeaker enclosures 102 and 103, while the locking tabs are at the end of legs 150 of loudspeaker enclosures 102 and 103. Thus, there are four locking mechanisms essentially identical as the one shown in FIG. 5.

Although the locking mechanism as shown is preferred, it will be apparent to those skilled in the art that other similar locking mechanisms could be equally employed without departing from the spirit and scope of the invention. Additionally, it should be noted that although it is preferred that the resulting arrangement appear as a solid structure without gaps or the like, when loudspeaker enclosures 102 and 103 are in the coupled, locked position, it is not absolutely essential to the invention. It will be apparent to those skilled in the art that other similar arrangements can be devised without departing from the spirit and scope of the invention.

The invention claimed is:

1. A loudspeaker enclosure comprising:

a first enclosure leg having at least one locking slot in a predetermined surface thereof and arranged to receive a locking tab; and a second enclosure leg having at least one locking tab protruding from a predetermined surface thereof and arranged to be inserted into a locking slot, said first enclosure leg and said second enclosure leg being physically arranged in an L-shape.

2. The loudspeaker enclosure defined in claim 1 wherein said predetermined surface of said first enclosure leg is an inner surface thereof and said predetermined surface of said second enclosure leg is an inner surface thereof.

3. The loudspeaker enclosure as defined in claim 2 wherein said first enclosure leg includes two locking slots in opposite inner surfaces thereof and said second enclosure leg includes two locking tabs protruding from opposite inner surfaces thereof.

4. The loudspeaker enclosure as defined in claim 3 wherein said second enclosure leg has a predetermined thickness and an upper surface and said first enclosure leg has a predetermined height above said upper surface of said second enclosure leg.

5. The loudspeaker enclosure as defined in claim 4 wherein said height of said first enclosure leg is substantially equal to said thickness of said second enclosure leg.

6. The loudspeaker enclosure as defined in claim 5 wherein said first enclosure leg has a rear surface and wherein said L-shape is formed by said upper surface of said second enclosure leg being at substantially a right angle to said rear surface of said first enclosure leg.

7. A loudspeaker arrangement comprising:

a first loudspeaker enclosure;

a second loudspeaker enclosure;

each of said first and second loudspeaker enclosures including a first enclosure leg having at least one locking slot in a predetermined surface thereof and arranged to receive a locking tab; and a second enclosure leg having at least one locking tab protruding from a predetermined surface thereof and arranged to be inserted into a locking slot, said first enclosure leg and said second enclosure leg being physically arranged in an L-shape.

8. A loudspeaker arrangement as defined in claim 7 wherein each of said second enclosure legs of said first and second loudspeaker enclosures has an upper surface, said first and second loudspeaker enclosures being in predetermined spatial relationship to each other so that said upper surfaces of said second enclosure legs are facing each other and said at least one locking tab on said first enclosure leg of said first loudspeaker enclosure is engaged in said at least one locking slot in said second enclosure leg of said second loudspeaker enclosure and said at least one locking tab on said second enclosure leg of said second loudspeaker enclosure is engaged in said at least one locking slot in said first enclosure leg of said first loudspeaker enclosure.

9. A loudspeaker arrangement as defined in claim 7 wherein said predetermined surface of each of said first enclosure legs is an inner surface thereof and said predetermined surface of each of said second enclosure legs is an inner surface thereof.

10. A loudspeaker arrangement as defined in claim 9 wherein said first enclosure leg of each of said first and second loudspeaker enclosures includes two locking slots in opposite inner surfaces thereof and said second enclosure legs of said first and second loudspeaker enclosures includes two locking tabs protruding from opposite inner surfaces thereof.

11. A loudspeaker arrangement as defined in claim 10 wherein each of said second enclosure legs of said first and second loudspeaker enclosures has an upper surface, said first and second loudspeaker enclosures being in predetermined spatial relationship to each other so that said upper surfaces of said second enclosure legs are facing each other and said locking tabs on said first enclosure leg of said first loudspeaker enclosure are engaged in respective corresponding ones of said two locking slots in said second enclosure leg of said second loudspeaker enclosure and said two locking tabs on said second enclosure leg of said second loudspeaker enclosure are engaged in said two locking slots in said first enclosure leg of said first loudspeaker enclosure.

12. The loudspeaker enclosure as defined in claim 11 wherein each of said second enclosure legs has a predetermined thickness and an upper surface and each of said first enclosure legs of said first and second loudspeaker enclosures has a predetermined height above said upper surface of said second enclosure leg.

13. The loudspeaker enclosure as defined in claim 11 wherein said height of each of said first enclosure legs is substantially equal to said thickness of each of said second enclosure legs of said first and second loudspeaker enclosures.

14. The loudspeaker enclosure as defined in claim 11 wherein each of said first enclosure legs of said first and second loudspeaker enclosures has a rear surface and wherein said L-shape for each of said first and second loudspeaker enclosures is formed by said upper surface of said second enclosure leg being at substantially a right angle to said rear surface of said first enclosure leg.

* * * * *